1,881,889

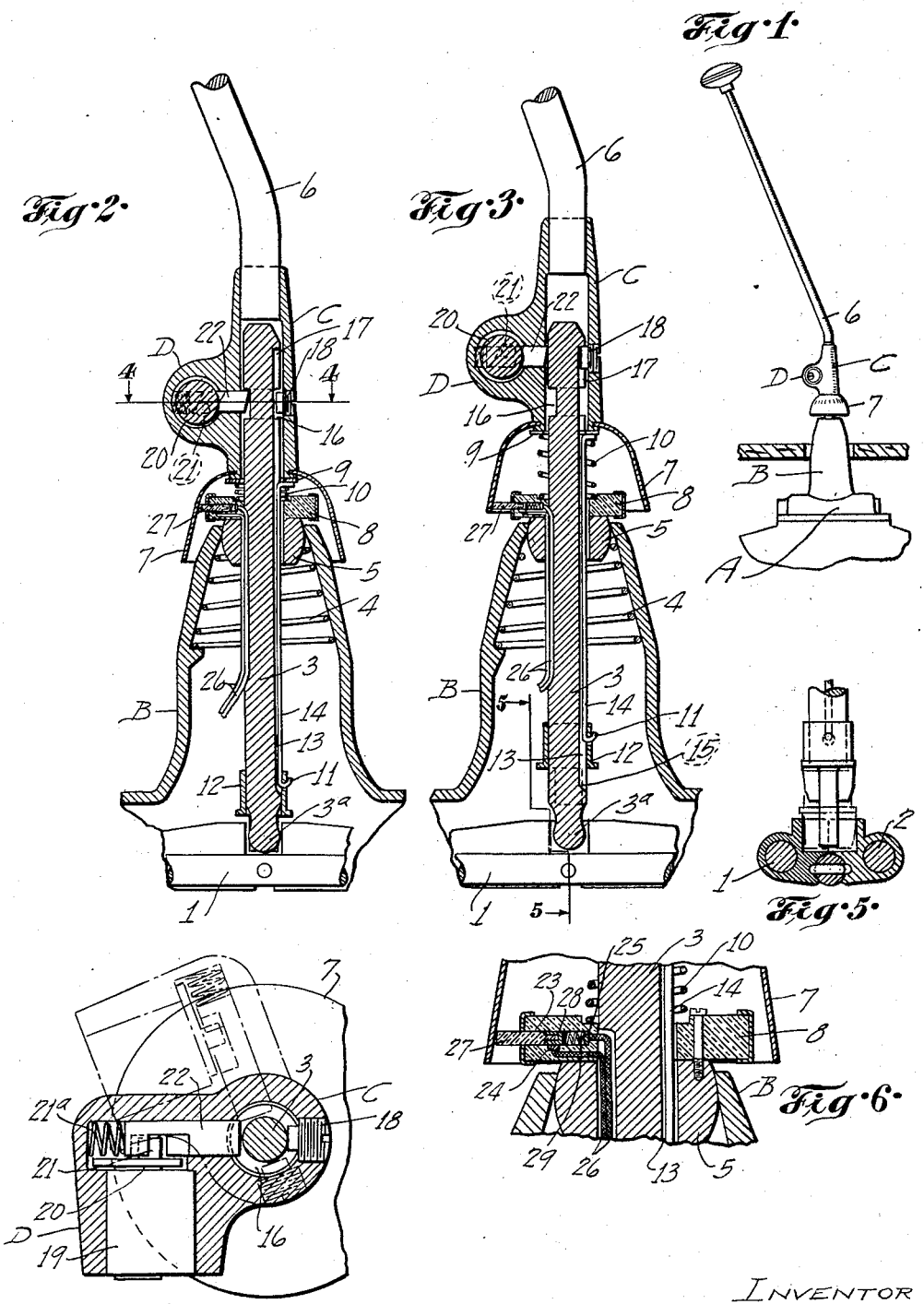
Oct. 11, 1932. E. V. NOSER 1,881,889
TRANSMISSION LOCK FOR MOTOR VEHICLES
Filed June 4, 1928
INVENTOR
Emil V. Noser.
BY
ATTORNEY Patented Oct. 11, 1932

UNITED STATES PATENT OFFICE

EMIL V. NOSER, OF ST. LOUIS COUNTY, MISSOURI, ASSIGNOR, BY MESNE ASSIGNMENTS, TO FRANK C. WEBB, OF ST. LOUIS, MISSOURI

TRANSMISSION LOCK FOR MOTOR VEHICLES

Application filed June 4, 1928. Serial No. 282,539.

This invention relates generally to motor vehicles and, more particularly, to certain new and useful improvements in devices for locking the transmission thereof.

My present invention has for its chief object the provision of a transmission-lock of so-called co-incidental type, that is to say, a lock capable of simultaneously breaking the electrical circuit between the engine and the source of current and locking the transmission against unauthorized actuation.

My invention has for a further object the provision of a lock of the type stated which is conveniently operable, which may be economically manufactured, which may be readily installed upon the vehicle, and which is efficient in the performance of its intended functions.

And with the above and other objects in view, my invention resides in the novel features of form, construction, arrangement, and combination of parts hereinafter described and pointed out in the claims.

In the accompanying drawing,—

Figure 1 is a reduced elevational view of a transmission-lock embodying my invention;

Figure 2 is a vertical sectional view of the lock, showing the handle-portion of the gear-shifting lever in so-called abnormal or depressed transmission locking and circuit-breaking position;

Figure 3 is a similar view, showing the handle-portion of the gear-shifting lever in normal or raised transmission unlocking and circuit-completing position;

Figure 4 is an enlarged detail section taken approximately on the line 4—4, Figure 2;

Figure 5 is a reduced detail section taken approximately on the line 5—5, Figure 3;

Figure 6 is an enlarged detail section of the co-operable electrical contact-members or terminals of the lock.

Referring now more in detail and by reference characters to the drawing, which illustrates a practical embodiment of my invention, the transmission proper, for present purposes, may be described as including a housing A suitably mounted in and upon the vehicle. Disposed in the housing, are shafts 1 and 2, each of which is axially shiftable in either direction from a neutral position, but which in standard equipment are incapable of simultaneous axial movement.

The transmission proper forms no part of my present invention; hence, suffice it now to say that, as is well understood, when the shafts 1, 2, are in neutral position, the engine and driving-gears of the vehicle are disconnected, and that, as the shafts 1, 2, are selectively shifted from neutral position to first, second, third, or reverse positions, the engine and driving or transmission gears are so interconnected as to control the speed or direction of travel of the vehicle. Operable to so shift the shafts 1, 2, and usually forming part of a standard transmission, is an upstanding lever 3 engageable at its lower end 3a with the respective shafts 1, 2, and which, when in neutral position, is out of engagement with both said shafts. Conjoined or otherwise connected to the housing A and for the most part enclosing the lever 3, is a more or less cone-shaped or conoidal casing B, yieldingly, as by a coiled spring 4, supported in the upper end of which and encircling the lever 3, is a preferably ball-pivot 5 for facilitating shaft-shifting actuations of the lever 3.

Disposed for slidable movement longitudinally of and upon the upper-end portion of lever 3, is a tubular casing-member or lever extension C. Fixed to the member or lever-extension C at its upper end, is a hand-gripping member 6, and fixed to the member C at its lower end, is a bell-shaped extension 7, which, it may be here stated, is of such relative diametrical dimension to surround the upper end of casing B on slidable depression of the lever-extension C. Disposed, for purposes shortly appearing, on the pivot 5, and also embracing the lever 3, is an insulation-ring 8, and coiled on lever 3 and interposed between the ring 8 and a washer-member 9 fitting against the lower end of lever-extension C, is an expansion-spring 10 normally maintaining the lever-extension C and its connected or attached parts yieldingly in normal or raised position or in the position thereof illustrated in Figure 3. Having its one or upper end hookwise engaged over the upper end of spring 10, at its lower end having supporting engagement or attachment, as at 11, with a collar-member 12 concealed within the casing B for slidable movement longitudinally upon the lever 3, and disposed in a longitudinal way 13 provided in lever 3 for the purpose, is a rigid link 14, and integral with or otherwise fixed to the collar 12, is a plug-like extension 15 adapted abnormally, on depression of the lever-extension C, to fit, as shown in Figure 2, between the shafts 1 and 2 to prevent actuation thereof by their normally actuating lever 3, the plug 15 being normally, as when the lever-extension C is in raised position, maintained out of engagement with the shafts 1, 2, under the resiliency or tension of the spring 10, as shown in Figure 3.

Formed in the lever 3 adjacent its upper end, is a circumferential groove or way 16, and also formed in the lever 3 and extending upwardly from the groove 16, is a longitudinally disposed surface-way 17 opening at its lower end into the groove 16 and preferably, though not necessarily, aligning with the way 13.

Preferably screw-seated in the lever-extension C, is a plug 18 adapted normally to fit at its inner-end in the way 17 and thereby, while permitting longitudinal depression of the lever-extension C and its attached parts relatively to the casing B and lever 3, securely retaining the lever-extension C and its attached parts in rigid conjoined relation, and from rotatory movement relatively, thereto.

Integral with or otherwise conjoined to the lever-extension C, is an enlargement or lock-housing D, mounted in which is any suitable key-actuable lock, which, for present purposes, may be described as including a casing 19 enclosing a rotatory-member or barrel 20 provided at its rear or inner-end with a projecting pin 21 having retracting engagement with a spring-pressed bolt 22 disposed in the housing D for shiftable movement to engage the lever 3.

Formed in the insulation ring 8, is a bore 23, and disposed in operative relation to bore 23, as best seen in Figure 6, are spaced terminals 24, 25, for conductors 26, 26 which lead to, and connect the engine with, any suitable source of current, not shown, carried by the vehicle, all as will be well understood. Mounted for slidable movement in bore 23 and adapted for engagement at its outer-end, by the lever-extension 7, is an insulation-plunger 27 carrying at its inner end a contact-member 28 adapted, under the tension of a spring 29 interposed between the one terminal 25 and the plunger 27, to normally electrically engage the terminal 24 to metallically through the spring 29 close the circuit between the conductors 26.

Normally, as I have described, the lever-extension C and its attached parts are yieldingly, under the tension of spring 10, maintained in raised position or in the normal position thereof illustrated in Figure 3, in which position the lever 3 and its extension C are held by the interengaging way 17 and plug 18 in rigid, conjoined relation, for shaft-shifting actuations, the plug 15 is out of shaft locking position, the contact-member 28 is in electrical engagement with the terminal 24, and the locking bolt 22 merely loosely engages with and upon the surface of the lever 3. The lever 3 and its extension C thus form substantially a two-part lever, and when the parts are in normal position, the engine circuit is closed and the lever 3 may be actuated to selectively shift the shafts 1 and 2.

Should it now be desired to lock the vehicle from unauthorized use, the lever extension C, by means of its handle 6, is depressibly shifted upon and relatively to lever 3 and against the tension of spring 10, in which movement the plug or projection 18 slides in the way 17 and the inner free end of the spring-pressed bolt 22 rides upon the surface of the relatively stationary lever 3. As is best seen in Figures 2 and 3, the projection 18 and bolt 22 are in alignment transversely of the lever 3, and as the projection 18 and bolt 22 reach, on depression of the member C, the plane of the circumferential groove 16, the locking-bolt 22, under the tension of its projecting spring 21a, automatically shifts into the groove 16. The lever extension C is thereby locked in depressed or abnormal position, and when in such position is freely rotarily movable, by reason of the engagement of the plug 18 and bolt 22 with lever 3 merely at its groove 16, relatively to the lever 3, as illustrated in Figure 4. Such now permissible swivel movement of lever-extension C not only increases the efficiency of the lock, but also permits the driver, usually seated on the left-hand side of the vehicle, to conveniently and as a matter of safety, use the right hand side of the vehicle in getting out.

Now, in such depressible movement of the extension C, the plug 15 is also shifted downwardly to reside between the shafts 1 and 2 and thereby prevents actuation thereof. Further, and at the same time, as the lever C is downwardly depressed, the plunger 27 is forced inwardly by the bell-shaped member 7 and contact-member 28 thereby shifted out of electrical engagement with the fixed terminal 24, the engine circuit being consequently broken.

Thus I provide a transmission lock of the coincidental type, which is readily and conveniently operable, and which fulfills in every respect the objects before stated.

Upon a key, not shown, being inserted in the lock 19, the bolt 22 may be retracted against the tension of spring 21a out of engagement with the lever C, when the lever C and its associate parts automatically, under the tension of spring 10, return to normal raised position.

I am aware that changes in the form, construction, arrangement, and combination of the several parts of my new lock may be made and substituted for those herein shown and described without departing from the nature and principle of my invention.

Having thus described my invention, what I claim and desire to secure by Letters Patent is:

1. In a transmission lock, a housing, a shaft-shifting lever including a first member and a second member, the first member being disposed for the most part in the housing and having an end portion projecting therefrom and provided longitudinally with a surface groove and the second member being sleeved for shiftable movement upon said end portion of the first member, a projection on the second member fitting in said groove and engageable with the walls thereof for normally rigidly interconnecting said members for shaft-shifting actuations, and a coiled spring interposed between the housing and said second lever-member for yieldingly retaining said second member in normal position relatively to the first member.

2. In a transmission lock, a two part shaft-shifting lever, one of which parts is shiftable longitudinally relatively to the other, means for normally interconnecting said parts for shaft-shifting actuations, and means for releasably locking the one part in shifted abnormal position relatively to the other part.

3. In a transmission lock, a two part shaft-shifting lever, one of which parts is shiftable longitudinally relatively to the other, means for normally interconnecting said parts for shaft-shifting actuations, and means for locking the one part in shifted abnormal position relatively to the other part, said means including a key operable bolt carried by the second member and adapted for engagement with the first member.

4. In a transmission lock, a shaft-shifting lever including a first member and a second member, the second member having a tubular portion sleeved for shiftable movement upon an end portion of the first member, means for normally interconnecting said members for shaft-shifting actuations, and means for releasably locking the second member in shifted abnormal position relatively to the first member, said last-named means including a spring pressed key retractable bolt carried by the second member and adapted for engagement with the first member.

5. In a transmission lock, a shaft-shifting lever including a first member and a second member, the second member having a tubular portion sleeved for shiftable movement upon an end portion of the first member, means for normally interconnecting said members for shaft-shifting actuations, means for releasably locking the second member in shifted abnormal position relatively to the first member, and means for yieldingly retaining the second member in normal position relatively to the first member.

6. In a transmission lock, a two part shaft-shifting lever, one of which parts is shiftable longitudinally relatively to the other and when in abnormal shifted position is also rotarily movable relatively to the other.

7. In a transmission lock, a two part shaft-shifting lever, one of which parts is shiftable longitudinally relatively to the other, means for normally interconnecting said parts for shaft-shifting actuations, and means for releasably locking the one part in shifted abnormal position relatively to the other part, said one part when in said abnormal position being also rotarily movable relatively to the other part.

8. In a transmission lock, a shaft-shifting lever including a first member and a second member, the second member having a tubular portion sleeved for longitudinal shiftable movement upon an end portion of the first member, means for normally interconnecting said members for shaft-shifting actuations, means for yieldingly retaining the second member in normal position relatively to the first member, and means for releasably locking the second member in shifted abnormal position relatively to the first member, the second member being rotarily movable relatively to and upon the first member when in shifted abnormal position.

9. In a transmission lock, a shaft-shifting lever including a first member and a second member, the first member having a circumferential groove and the second member having a tubular portion sleeved for shiftable movement upon the first member and over said groove, means for normally interconnecting said members for shaft-actuations, means for yieldingly retaining the second member in normal position relatively to the first member, and means for releasably locking the second member in shifted abnormal position relatively to the first member, said last-named means including a bolt carried by the second member and adapted, when the second member is in shifted abnormal position, for engagement at said groove with the first member.

10. In a transmission lock, a shaft-shifting lever including a first member and a second member, the first member having a circumferential groove and a longitudinal way opening at its base into said groove, and the second member having a tubular portion sleeved for shiftable movement upon the first member and over said groove and way, a projection upon the second member slidably fitting for movement in said way for normally interconnecting said members for shaft-actuations, means for yieldingly retaining the second member in normal position relatively to the first member, and means for releasably locking the second member in shifted abnormal position, said last-named means including a bolt carried by the second member for engagement with the first member, both said projection and said bolt fitting in said groove when the second member is in shifted abnormal position and permitting rotatory movement of the second member relatively to the first member.

11. In a transmission lock, a shaft-shifting lever comprising a pair of co-operating parts, one of said parts being disposed lengthwise substantially in aligning relation with and at an end fitting over the other part, said one part including a hand-gripping portion for shaft-shifting actuation of the lever and being shiftable longitudinally relatively to and over said other part.

12. In a transmission lock, a shaft-shifting lever comprising a pair of co-operating parts, one of said parts being disposed lengthwise substantially in aligning relation with and having an end-portion sleeved over the other part, said one part including a hand-gripping portion for shaft-shifting actuation of the lever and being shiftable longitudinally relatively to said other part, and means for normally rigidly interconnecting said parts for shaft-shifting actuations.

13. In a transmission lock, a shaft-shifting lever including a pivoted member having a longitudinal surface groove in an end-portion thereof, a hand-gripping member disposed lengthwise substantially in aligning relation with and having an end-portion sleeved over said grooved end-portion of the pivoted member, said hand-gripping member being longitudinally shiftable upon said end-portion of the pivoted member, and a projection on the hand-gripping member fitting in said groove and engageable with the walls thereof for normally rigidly interconnecting said members for shaft-shifting actuations.

14. In a transmission lock, a shaft-shifting lever including a pivoted member having a longitudinal surface groove in an end portion thereof, a hand-gripping member disposed lengthwise substantially in aligning relation with and having an end-portion sleeved over said grooved end-portion of the pivoted member, said hand-gripping member being longitudinally shiftable upon said end portion of the pivoted member, a projection on the hand-gripping member fitting in said groove and engageable with the walls thereof for normally rigidly interconnecting said members for shaft-shifting actuations, and means for yieldingly retaining the hand-gripping member against shiftable movement relatively to the pivoted member.

In testimony whereof, I have signed my name to this specification.

EMIL V. NOSER.